July 19, 1966  C. H. YOUNGBERG ETAL  3,261,411
DISK SCRAPER
Filed Dec. 29, 1964
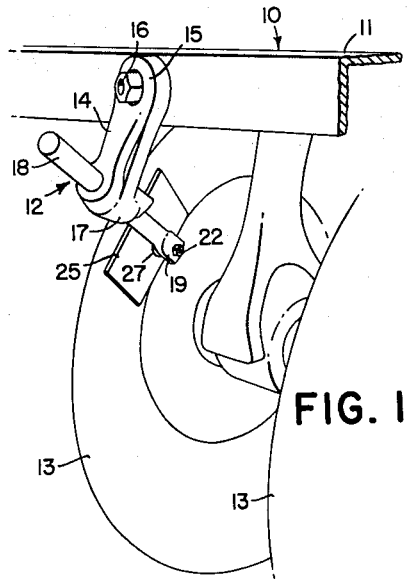
FIG. 1
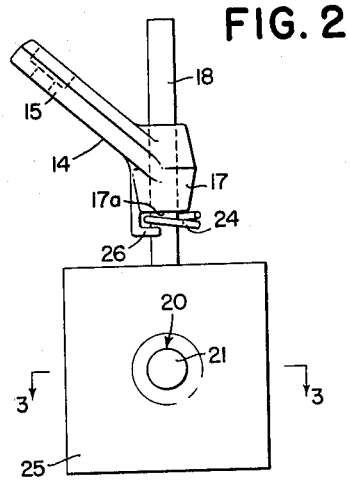
FIG. 2
FIG. 5
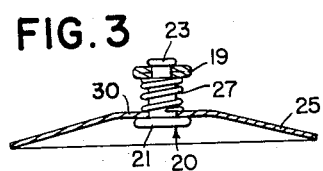
FIG. 3
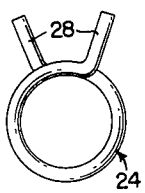
FIG. 4
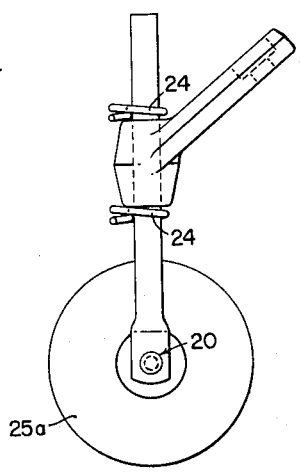
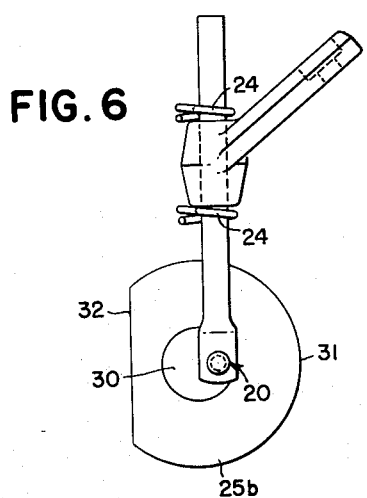
FIG. 6
INVENTORS.
CHARLES H. YOUNGBERG
WILLARD E. PETERSON JR.
BY
John C. Thompson
ATTORNEY

United States Patent Office 3,261,411
Patented July 19, 1966

3,261,411
DISK SCRAPER
Charles H. Youngberg, Moline, and Willard E. Peterson, Jr., Colona, Ill., assignors to Deere & Company, Moline, Ill., a corporation of Delaware
Filed Dec. 29, 1964, Ser. No. 421,874
8 Claims. (Cl. 172—559)

This application is a continuation-in-part of applicant's copending application Serial No. 347,435, filed February 26, 1964, now abandoned.

This invention relates generally to agricultural implements and more particularly to disk implements, such as disk harrows or the like.

The object and general nature of this invention is the provision of new and improved scraper means for the disks of a disk harrow or similar implement. The ground-working disks of a disk implement perform best when the inner or concave surface of the disk is kept clean and free of adhering soil. Conventionally, scrapers in the form of generally flat or curved blades are fixedly carried on the harrow frame by suitable clamps and spaced sufficiently close to the inner or concave surface of the disk so as to remove adhering soil. According to this invention, we provide new and improved scraper means in the form of relatively small scraper blades arranged so as to have substantially edge contact with the associated earth-working disk, the blades being held with relatively light spring pressure against the associated disk so as to effectively clean the inner face of the latter yet not bear with sufficient force against the disk so as to create objectionable or excessive friction that might interfere with the rotation of the disk.

More particularly, it is a feature of this invention to provide disk scraper means in the form of a bracket or arm that is adapted to be attached rigidly to the implement frame and provided with a sleeve section carrying a supporting shaft that is adapted to rotate therein, the shaft being located so as to lie close to the inner face of the associated soil-working disk and provided with means rotatably receiving the associated scraper blade so that not only may the latter be shifted longitudinally in the sleeve to vary the position of the scraper blade radially relative to the soil-working disks, as may be required, but also the scraper blade may rotatably shift or adjust itself so as to take care of any irregularities that may occur or arise in the associated soil-working disk.

It is also a feature of this invention to provide new and improved means for easily and quickly adjusting the position of the shaft longitudinally in the supporting arm sleeve so as to vary the position of the scraper blade generally radially of the associated soil-working disk, as may be desirable or necessary.

Another object of this invention is to provide a polygonal scraper blade adapted to clean a conical disk.

A further object of this invention is to provide a hollow frustoconical scraper blade adapted to clean disks.

A still further object of this invention is to provide a hollow frustoconical disk in which a portion along a chord has been removed, the removed portion permitting the escape of dirt and other foreign matter.

These and other objects and advantages of this invention will be apparent to those skilled in the art after a consideration of the following detailed description of the preferred embodiment in which the principles of this invention have been incorporated.

In the accompanying drawings:

FIG. 1 is a perspective view of a portion of a disk harrow incorporating the principles of this invention, the harrow having conical disks and the scraper blade being square in outline.

FIG. 2 is an enlarged side view of the disk scraper means detached from the harrow.

FIG. 3 is a sectional view taken along the line 3—3 of FIG. 2.

FIG. 4 is a view similar to FIG. 2 but showing a hollow frustoconical scraper blade and a simplified form of supporting bracket construction.

FIG. 5 is a detailed view of the clamp employed to retain the scraper blade shaft in the supporting bracket.

FIG. 6 is a view similar to FIG. 4 but showing a hollow frustoconical scraper blade having a chordal portion removed.

Referring first to FIG. 1, the disk harrow, in which the principles of this invention have been incorporated, is shown only fragmentarily in FIG. 1 and includes a frame 10 including a rear angle member 11 to which the scraper means, shown in its entirety by the reference numeral 12, are adapted to be connected. In the form of the invention shown in FIG. 1, the disks 13 of the harrow are shown as conical disks, such as those shown in U.S. Patent 3,005,501, issued October 24, 1961, to W. R. Frank, to which reference may be made if desired.

The scraper means 12 includes a support or bracket 14 having an upper section 15 apertures to receive a connecting bolt or other fastener 16 that preferably extends through an opening in the frame angle 11, whereby the support or bracket 14 may be fixed firmly and rigidly to the disk harrow. Each support or bracket 14 includes a lower sleeve section 17 that, when the support bracket is in place, has its axis extending generally radially with respect to the associated disk 13. Disposed within the sleeve section 17 is a shaft 18 having a flattened end 19 that is apertured to receive a disk-carrying stud 20. A square scraper blade 25 is loosely carried by the stud and the latter has a head 21 at one end and is connected by any suitable means so as to be rigid with the flattened end 19 of the shaft 18. In one form of this invention, the stud 20 has a shoulder and a threaded end that receives a nut 22. If desired, however, the threaded arrangement may be omitted and the reduced end of the stud riveted over, as at 23 in FIG. 3.

The shaft 18 may be adjusted longitudinally of the sleeve section 17 and preferably is held in position by a hose clamp 24 of the spring-wire type having ends 28 (FIG. 5) by which suitable tubular tool means may be engaged therewith to open the clamp and slide the latter and the sleeve section relative to the shaft 18. When only one hose clamp 24 is utilized, the sleeve section 17 is provided with an overhanging lip 26 which cooperates with the adjacent end 17a of the sleeve section to retain the hose clamp 24 and shaft 18 in adjustable position within the sleeve 17. The hose clamp has sufficient gripping power that it will not slip along the shaft 18, whereby the shaft is retained in selected axial position.

There is a spring 27 disposed between the back side of each scraper blade, and the spring 27 bears against the blade and the flattened end 19 of the shaft, each blade being loose on the stud so that there can be relative movement between the blade and the shaft as well as rotational movement of the shaft in the sleeve section. Thus, any irregularities in the ground-engaging disks will be tolerated and the spring 27 will hold the scraper blade firmly up against the adjacent face of the associated disk.

In the form of the invention shown in FIG. 4, the blade 25a is not square, as shown in FIGS. 1 and 2, but is conical and is therefore particularly adapted to fit against the usual concavo-convex disk. The blade 25a has substantially the same cross section as the blade 25 shown in FIG. 3. In the bracket shown in FIG. 4, the lip 26 is omitted and two hose clamps 24 are employed, one at each end of the sleeve section 17, for holding the shaft 18 in different positions of adjustment longitudinally of the supporting bracket.

In some types of operations of a disk implement soil and/or other foreign matter will build up under the conical blade 25a. It has been found that this build-up of soil can be eliminated by employing the scraper blade 25b shown in FIG. 6. The blade 25b is generally similar to the blade 25a shown in FIG. 4, but the blade 25b has had a chordal portion removed. Thus dirt will not be trapped under the blade but may escape through the cut-out. To keep the blade 25b with its leading edge 31 properly disposed upon the associated disk, the central portion 30 of the blade 25b is apertured off-center and mounted on the stud 20 in such a manner that the center of gravity of the blade lies between the stud 20 and the chord edge 32.

While we have shown and described above the preferred structure in which the principles of this invention have been incorporated, it is to be understood that our invention is not to be limited to the particular details, shown and described above, but that, in fact, widely different means may be employed in the practice of the broader aspects of our invention.

What is claimed is:

1. In an implement having rotary earth-working disk means carried by a generally horizontal transversely extending frame, the combination therewith or scraper means for said disk means, said scraper means including a generally downwardly extending bracket secured to said frame, said bracket including a sleeve section arranged so that the axis of the sleeve extends in a generally radial direction relative to the associated disk means, a shaft rotatable and axially shiftable in said sleeve section and having a lower end extending below said sleeve and adapted to be disposed adjacent said disk, means disposed about the shaft and engageable with the sleeve section to hold the shaft within the sleeve to prevent relative axial movement, stem means rigidly secured to the lower end of said shaft and extending at right angles from the shaft, the end of the stem remote from the shaft being provided with abutment means, a rotatable scraper blade loosely disposed about said stem between the shaft and the abutment, and resilient means disposed about said stem between the shaft and the scraper blade, said resilient means being adapted to bear against said scraper blade to hold it against said abutment means.

2. The invention set forth in claim 1 in which said holding means comprises two circular spring hose clamps which frictionally but releasably grip the shaft on opposite sides of said sleeve section.

3. The invention set forth in claim 1 in which said sleeve section includes an overhanging lip disposed to one end and said holding means includes a circular spring hose clamp which frictionally but releasably grips the shaft between said overhanging lip and said one end.

4. The invention set forth in claim 1 in which the scraper blade is square so as to fit against conical disks.

5. The invention set forth in claim 1 in which the scraper blade is a hollow conical member having a chordal portion removed, the center of gravity of the scraper blade being disposed between said stem and the chord edge of the blade.

6. In an implement having rotary earth-working disk means carried by a generally horizontal transversely extending frame, the combination therewith of scraper means for said disk means, said scraper means including a generally downwardly extending bracket secured to said frame, said bracket including a sleeve section at its lower end, a shaft rotatable and axially shiftable in said sleeve section and having a lower end extending below said sleeve and adapted to be disposed adjacent said disk, means connected with the lower end of said shaft for supporting a scraper blade thereon, and means holding the shaft within the sleeve, said holding means comprising two circular spring hose clamps which frictionally but releasably grip the shaft on opposite sides of said sleeve section.

7. In an implement having rotary earth-working disk means carried by a generally horizontal transversely extending frame, the combination therewith of scraper means for said disk means, said scraper means including a generally downwardly extending bracket secured to said frame, said bracket including a sleeve section at its lower end, the sleeve section being provided with an overhanging end adjacent one end, a shaft rotatable and axially shiftable in said sleeve section and having a lower end extending below said sleeve and adapted to be disposed adjacent said disk, means connected with the lower end of said shaft for supporting a scraper blade thereon, and means holding the shaft within the sleeve, said holding means comprising a circular spring hose clamp which frictionally but releasably grips the shaft between said overhanging lip and said one end.

8. In a disk harrow having a frame and a rotatable disk, a disk scraper blade, means mounting said disk scraper on said frame for rockable movement, said disk scraper blade comprising a hollow conical member having a chordal portion removed, the center of gravity of the disk scraper blade being disposed between said mounting means and the chord edge of the blade.

References Cited by the Examiner
UNITED STATES PATENTS

| | | | |
|---|---|---|---|
| 808,021 | 12/1905 | Davis | 172—559 |
| 998,747 | 7/1911 | Cast | 172—566 |
| 1,791,462 | 2/1931 | Bermel | 172—559 |
| 2,730,940 | 1/1956 | Rimple | 172—558 |

ANTONIO F. GUIDA, *Acting Primary Examiner.*

WILLIAM A. SMITH III, *Examiner.*